UNITED STATES PATENT OFFICE.

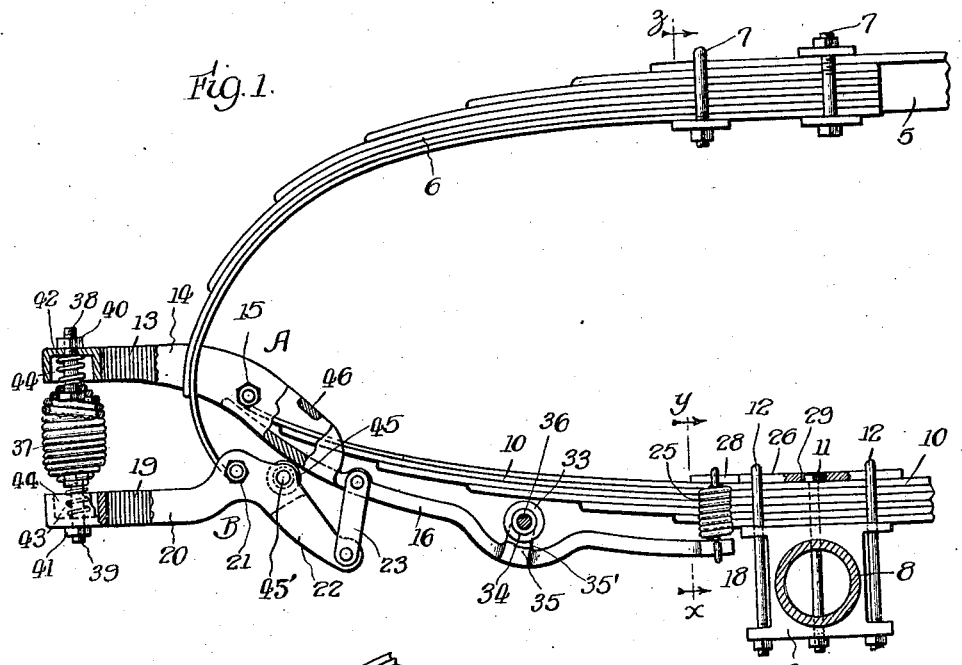

JAMES M. KERR, OF CRAWFORDSVILLE, INDIANA.

SHOCK ABSORBER.

1,419,629.  Specification of Letters Patent.  Patented June 13, 1922.

Application filed March 11, 1922. Serial No. 542,861.

*To all whom it may concern:*

Be it known that I, JAMES M. KERR, a citizen of the United States, and a resident of Crawfordsville, in the county of Montgomery and State of Indiana, have invented certain new and useful Improvements in Shock Absorbers, of which the following is a specification.

My invention relates to shock absorbers for automotive vehicles, particularly vehicles with semi-elliptic or quarter-elliptic supporting springs. The object of the invention is to provide improved construction and arrangement of shock absorbing mechanism which will cause efficient absorption of all shocks during approach of the vehicle body and axles and also during separation of the body and axles.

My improved construction and arrangement is clearly illustrated on the accompanying drawing, in which—

Fig. 1 is a side elevational view of the end of a vehicle showing my improved shock absorbing attachment interposed between an axle structure and the vehicle body, Fig. 2 is a sectional view on plane $x\ y$ Fig. 1, Fig. 3 is a sectional view on plane $x\ z$ Fig. 1, showing a modified form of coil spring, and Fig. 4 is a side elevational view showing a modified arrangement.

On the drawing 5 represents one of the side beams of the vehicle chassis whose end 6 may be a continuation of the beam or a rigid extension thereon, or in the form of the quarter-elliptic spring shown. The spring may be secured to the beam end by means of clevis or bolt devices 7 as clearly shown in Fig. 1. The axle 8 has a fitting 9 by means of which the axle spring 10 may be secured. As shown a center bolt 11 extends through the center of the spring, and clevises or straps 12 extend through the sides of the fitting and around the spring all in a well known manner. The inner end of the spring 10 is usually connected directly to the vehicle chassis side beam 5 or by means of a shackle (not shown). At its outer end the spring 10 is usually connected with the end of the body extension spring 6 by means of a suitable shackle, but when my shock absorber mechanism is to be attached this shackle is removed.

Describing now the shock absorber mechanism, it comprises the upper and lower levers indicated as a whole by A and B. The lever A has the side walls 13 and 14 which support the bolt 15 which receives the outer end of the spring 10. The base or body 16 of the lever extends inwardly and below the spring 10 and terminates at its springs which will be referred to later.

The lever B has the side walls 19 and 20 for supporting the bolt 21 which receives the end of the spring 6 extending from the body. The inner end 22 of the lever B extends inwardly below the lever A and at its inner end is connected by the shackle 23 with the lever A, the connection of the shackle with the lever A being a distance inwardly from the fulcrum point 15 of the lever. The shackle 23 may be the same shackle which primarily directly connected the ends of the springs 10 and 6.

Connecting with the ears 17 and 18 at the inner end of lever A are the shock absorber expansion springs 24 and 25 which, as shown in Figs. 1 and 2, may be anchored at their upper ends from a plate 26 supported on the spring 10. As shown the plate is secured by being clamped under the clevises 12, the plate having the side ears 27 and 28 at its outer end for receiving the ends of the shock absorber springs. The plate has the hole 29 for receiving the head of the bolt 11, the bolt thus preventing longitudinal displacement of the plate. The shock absorber springs extend alongside of the axle spring 10, and instead of anchoring the springs from the axle structure they may be anchored at the body of the vehicle. As shown in Fig. 3 the shock absorber springs 30 and 31 are anchored at their upper ends to the plate 32 which is held in place by the clevis bolt 7 which also secures the spring 6 to the vehicle side beam 5.

At a point intermediate the inner end of the lever A and its connection with the shackle 23 an abutment roller 33 is provided, this roller being rotatable on the pin 34 which is secured in the walls 35 and 35′ extending upwardly from the opposite sides of the lever base 16. The roller is preferably of some elastic resilient material such as rubber, and a metal bushing 36 is preferably provided therefor.

Between the front ends of the levers A and B is the shock absorbing spring 37. In Fig. 1 this spring is shown of the expansion type. Its ends are secured to the heads of the bolts 38 and 39 which extend through the ends of the levers to be received at their outer ends by the nuts 40 and 41 respectively. By means of the nuts the spring can be readily adjusted to exert the proper resistance to separation of the levers. To prevent loosening and rattling of the spring 37 spring washers 42 and 43 encircle the bolts between the spring and the respective levers, these washers holding the bolts against displacement when the spring 37 recoils, or during travel of the car. To protect the washers and the ends of spring 37 the ends of the levers may be provided with the pockets 44 and 44′ as clearly shown in Fig. 1.

The lever B is provided with a rubber roller 45 rotatable on the pin 45′ which is supported between the side walls of the lever intermediate the connections of the spring 6 and shackle 23 with the lever. The roller is below the lever A intermediate the connections of the lever with the shackle and with the spring 10.

The shock absorber spring will cooperate with the levers to absorb shocks during approach of the springs 6 and 10 or separation thereof. In other words the shock absorber attachment will operate with equal efficiency during down travel of the vehicle body or upthrow thereof. When the vehicle body and axle approach, as for example when the body is put under load or the axle structure is raised as the wheels travel over rough roadway, the ends of the springs 6 and 10 separate and tend to carry the levers A and B bodily away from each other. However, as these levers are connected inwardly of their connections with the springs by the shackle 23 the lever A will be rotated in clockwise direction with the lever B in counter clockwise direction, such swing being resisted by the spring 37 and also by the springs 24 and 25. The shock absorber springs will absorb the lesser shocks and also the heavier shocks in greater part, any shocks which are not fully absorbed being gradually transferred to the vehicle springs which will then function.

During separation of the axle structure and the vehicle body, as for example when the axle structure drops into a depression in the roadway or the body is thrown upwardly after passage of the wheels over an obstruction, the ends of the springs 6 and 10 will move towards each other and the levers A and B will swing respectively in counter clockwise and clockwise directions until the roller 33 strikes the spring 10 and the roller 45 strikes the lever A. For example, suppose that the vehicle wheel has traveled over a bump in the road and the levers A and B were swung in clockwise and counter clockwise directions respectively to expand the shock absorber springs. Then upon release of the wheel from the obstruction the shock absorber springs will rotate the levers in the opposite directions until the rollers abut. When return movement of the axle structure is sudden the rubber rollers will cushion the impact and absorb more or less of the shocks. Also, when the axle structure is suddenly released from a bump, the pressure is removed from the axle spring 10 and also the vehicle spring 6 and these springs tend to relax. The spring 10 will tend to curl up and the spring 6 will tend to uncurl at its end. As the spring 10 relaxes and curls up it will tend to raise the lever A, but as the roller 33 comes into abutment against the spring, the lever will be fulcrumed at the roller around which fulcrum it will swing in clockwise direction. Uncurling of the spring 6 at its end will tend to move the lever B downwardly, but as the lever is fulcrumed at its inner end from the lever A by the shackle 23 the lever B will be swung downwardly, the result being that the levers are separated at their outer ends and the shock absorbing spring 37 is stretched. Rotation of the lever A around its roller also stretches the shock absorbing springs 24 and 25. Thus the shocks which would otherwise be occasioned by the rapid separation of the body and axle are absorbed by the shock absorbing attachment, the rubber rollers first taking up the recoil impact and the shock absorbing springs then functioning to absorb the remainder of the shock. I have shown an abutment bridge 46 extending between the side walls 13 and 14 of the lever A and above the end of the spring 10. This bridge will engage with the spring should the shock absorbing springs 24 and 25 break or become disconnected, and the levers will then be supported until repairs can be made.

In Fig. 4 I have shown a modified arrangement. The construction is exactly the same as in Fig. 1 with the exception that a compression spring 47 is provided between the outer ends of the levers A and B instead of the expansion spring shown in Fig. 1. To accommodate the compression spring the lever A at its outer end 48 is deflected downwardly and then forwardly while the lever B is extended upwardly and outwardly through the end of lever A. The ends of the lever are thus in vertical alignment and have the pockets 49 and 50 respectively for receiving the compression spring.

I thus provide simple shock absorbing mechanism which can be readily applied to a vehicle and which will efficiently absorb shocks during all conditions of travel, the mechanism being particularly adaptable for throttling and absorbing shocks which would otherwise occur during upthrow of the vehicle body. I do not desire to be limited to the exact construction, arrangement and operation shown and described as changes and modifications can readily be made which would still come within the scope of the appended claims.

Having described my invention, I claim as follows:

1. In a vehicle, the combination with the vehicle body, an axle, a leaf spring secured on the axle and extending outwardly therefrom, and an extension from the body terminating below the outer end of said axle spring, of a lever fulcrumed on the outer end of said axle spring, said lever extending outwardly from the spring end rearwardly below the spring, an elastic member connected between the inner end of said lever and a part of the vehicle, a second lever below the first mentioned lever fulcrumed intermediate its ends on the end of said body extension, the outer end of said second lever terminating below the outer end of said first mentioned lever, an elastic member between the outer ends of said levers, and a pivot connection between the inner end of said second lever and the first mentioned lever, said elastic members resisting separation of said levers at their outer ends.

2. In a vehicle, the combination with the vehicle body, an axle, a leaf spring secured to the axle and extending outwardly therefrom, and an arm on said body extending outwardly around the end of the axle spring and terminating below such end, a lever fulcrumed intermediate its ends on the outer end of said spring, the outer end of said lever extending outwardly beyond said arm and the inner end of said lever extending inwardly below the spring, elastic means connected with the inner end of said lever for resisting swing thereof, a second lever fulcrumed intermediate its ends on the end of said arm, a connection between the inner end of said second lever and the first mentioned lever inwardly of the fulcrum point of said first mentioned lever, and means connecting between the outer ends of said levers for resisting swing of said levers.

3. The combination with the upper and lower elliptic spring members of a vehicle, the upper spring member extending around and terminating below the end of the lower spring member, of a shock absorber lever fulcrumed intermediate its ends at the end of said lower spring member, the inner end of said lever extending inwardly below the lower spring member, a second lever below said first mentioned lever fulcrumed intermediate its ends on the end of the upper spring member, said second lever being suspended at its inner end from the first mentioned lever at a point inside of the fulcrum of said first mentioned lever, elastic means between the outer ends of said levers, and elastic means between the inner end of the first mentioned lever and a part of the vehicle, said elastic means resisting swing of said levers to separate them at their outer ends.

4. The combination with the upper and lower elliptic spring members of a vehicle, the upper spring member extending around and terminating below the end of the lower spring member, of a lever fulcrumed intermediate its ends at the end of the lower spring member, the inner end of said lever extending inwardly below said lower spring member, a second lever below the first mentioned lever fulcrumed intermediate its ends at the end of the upper spring member, a shackle connecting the inner end of said second lever with the first mentioned lever inwardly of the fulcrum point of the first mentioned lever, a spring connecting between the outer ends of said levers, and a spring connected with the inner end of said first mentioned lever, said springs resisting swing of said levers.

5. The combination with the upper and lower elliptic spring members of a vehicle, the upper spring member extending around and terminating below the outer end of the lower spring member, of an upper lever fulcrumed intermediate its ends on the outer end of said lower spring member, a lower lever suspended at its inner end from the upper lever at a point inwardly of the fulcrum of said upper lever, the end of said upper spring member connecting with said lower lever intermediate the ends of said lever, elastic mechanism between the outer ends of said levers, and elastic mechanism connected with the inner end of said upper lever, said elastic mechanism resisting swing of said levers.

6. The combination with the upper and lower elliptic spring members of a vehicle, the upper spring member terminating at its end below the end of the lower spring member, of a lever fulcrumed intermediate its ends on the end of the lower spring member, a second lever below the first mentioned lever having fulcrum connection at its inner end with the first mentioned lever at a point inwardly of the fulcrum connection of said first mentioned lever, said upper spring member connecting at its end with said second lever intermediate the lever ends, elastic means between the outer ends of said levers, and elastic means connected with the inner end of said first mentioned lever, said elastic means resisting swing of said levers.

7. In a vehicle, the combination with the vehicle body, the axle, a leaf spring secured on the axle and extending outwardly therefrom, and an arm extending from the body part around the end of the spring and terminating below the spring end, of a lever fulcrumed intermediate its ends on the end of said spring, a second lever having fulcrumed connection at its inner end with the first mentioned lever at a point inwardly of the fulcrum connection of said first mentioned lever, the end of said arm connecting with said second lever intermediate its ends, elastic means between the outer ends of said levers for resisting relative swing thereof, and an abutment on the inner end of said first mentioned lever for abutting against the under side of said axle spring when said spring relaxes to form a fulcrum point for said lever, and elastic means connected with the inner end of said first mentioned lever for resisting swing thereof.

8. In a vehicle, the combination with the vehicle body, the axle, a leaf spring secured on the axle and extending outwardly therefrom, and an arm extending from the vehicle body and terminating below the end of said axle spring, of a lever normally fulcrumed intermediate its ends at the end of said axle spring, a second lever having fulcrum connection at its inner end with said first mentioned lever inwardly of the fulcrum connection of said first mentioned lever, the end of said arm connecting with said second lever intermediate the lever ends, elastic mechanism between the outer ends of said levers, elastic mechanism connecting with the inner end of said first mentioned lever, said elastic mechanisms cooperating to resist swing of said levers, and an elastic abutment on said first mentioned lever inwardly of the fulcrum connection therewith of the second lever, said abutment engaging against the under side of said axle spring when said spring relaxes and forming the fulcrum point for the first mentioned lever during such relaxation.

In witness whereof, I hereunto subscribe my name this 7' day of March, A. D. 1922.

JAMES M. KERR.